United States Patent
Lin

(10) Patent No.: US 9,325,746 B2
(45) Date of Patent: Apr. 26, 2016

(54) SYSTEMS AND METHODS FOR ROUTING INTERNET PROTOCOL TELEPHONY COMMUNICATIONS

(71) Applicant: VONAGE NETWORK, LLC, Holmdel, NJ (US)

(72) Inventor: Xuhua Lin, Edison, NJ (US)

(73) Assignee: VONAGE BUSINESS INC., Atlanta, GA (US)

( * ) Notice: Subject to any disclaimer, the term of this patent is extended or adjusted under 35 U.S.C. 154(b) by 100 days.

(21) Appl. No.: 14/163,382

(22) Filed: Jan. 24, 2014

(65) Prior Publication Data

US 2015/0215344 A1 Jul. 30, 2015

(51) Int. Cl.
| | |
|---|---|
| *H04L 29/06* | (2006.01) |
| *H04L 12/66* | (2006.01) |
| *H04M 3/42* | (2006.01) |
| *H04M 7/00* | (2006.01) |
| *H04L 29/12* | (2006.01) |

(52) U.S. Cl.
CPC ........ *H04L 65/1069* (2013.01); *H04L 65/1053* (2013.01); *H04L 65/1056* (2013.01); *H04M 3/42314* (2013.01); *H04M 7/009* (2013.01); *H04L 29/12094* (2013.01); *H04L 61/20* (2013.01)

(58) Field of Classification Search
None
See application file for complete search history.

(56) References Cited

U.S. PATENT DOCUMENTS

| | | | | |
|---|---|---|---|---|
| 8,477,637 | B1 * | 7/2013 | Lang | ..................... H04L 43/10 370/252 |
| 8,948,358 | B1 * | 2/2015 | Rengarajan | ......... H04M 3/2218 370/356 |
| 2003/0161300 | A1 * | 8/2003 | Malik | ................. H04L 12/5692 370/352 |
| 2005/0278436 | A1 * | 12/2005 | Sharma | ................. H04M 3/537 709/223 |
| 2006/0256778 | A1 * | 11/2006 | Nakamura | ........ H04L 29/06027 370/352 |
| 2007/0211705 | A1 | 9/2007 | Sunstrum | |
| 2009/0080411 | A1 | 3/2009 | Lyman | |

OTHER PUBLICATIONS

Apr. 8, 2015 International Search Report and Written Opinion of the International Searching Authority issued in International Application No. PCT/US2015/012625.

* cited by examiner

*Primary Examiner* — Candal Elpenord
(74) *Attorney, Agent, or Firm* — Nixon & Vanderhye P.C.; Joseph Pagnotta

(57) ABSTRACT

When IP telephony devices that make use of an Internet protocol (IP) based private branch exchange (PBX) service provider resister with the PBX service provider, they furnish local area network address information that indicates how the telephony devices can be reached directly on the local area network to which they are connected. This information is provided to other telephony devices within the same business or organization. As a result, the telephony devices within a business or organization can contact one another directly to setup and conduct telephony communications over a local area network, without the need for such telephony communications to pass over a public data network, or though assets of the IP based PBX service provider.

23 Claims, 7 Drawing Sheets

SYSTEMS AND METHODS FOR ROUTING INTERNET PROTOCOL TELEPHONY COMMUNICATIONS

BACKGROUND OF THE INVENTION

The invention is related to Internet protocol (IP) based telephony communications systems. More specifically, the invention is related to IP based private branch exchange systems and service providers.

Traditionally, a professional services business that employed multiple individuals would provide each individual with a telephone at their respective desk. However, in light of the fact that it is unusual in most businesses for all the employees to be conducting telephone calls at the same time, the business would not have a separate telephone line connected to each telephone. Instead, the business would acquire a lesser number of external telephone lines, and those external telephone lines would be coupled to a special switching unit located within the business. Each of the employee telephones also would be coupled to the switching unit. The switching unit allows any employee telephone to be connected to any of the external telephone lines. The switching unit also allows a receptionist to answer each incoming telephone call, and then connect that call to the appropriate employee telephone. Such a switching system is commonly known as a private branch exchange (PBX) system.

The heart of a traditional the private branch exchange system is the switching unit to which the external lines and the employee telephones are connected. Unfortunately, such switching systems are relatively expensive. In addition, if a growing business purchases a first switching system with a certain capacity, it is common for the business to outgrow the first switching system. This usually means that the business must purchase a new, larger capacity switching system, and then discard or resell the first switching system.

With the rise in Internet protocol (IP) telephony systems, some IP telephony service providers have begun to offer telephony services that mimic a traditional private branch exchange system. Instead of all employee telephones being connected to a central switching unit located at the business, each employee is provided with an IP telephony device which is coupled to the Internet. When an employee's IP telephony device is first coupled to the Internet, it registers with the private branch exchange service provider, providing an Internet address at which it can be reached. Thereafter, incoming telephone calls can be directed to the employee telephone by the private branch exchange service provider via the Internet. Likewise, if an employee wishes to place an outgoing telephone call, the outgoing call is setup through the private branch exchange service provider via the Internet.

An IP based private branch exchange service has several advantages over a traditional switching unit based private branch exchange system. First, because employee IP telephony devices need only be connected to the Internet, the employees can be located virtually anywhere they can obtain access to the Internet. There is no longer a need for an employee telephone device to be hard wired to a PBX switching unit.

In addition, an IP based private branch exchange service provider can allow a business to scale upward and downward, in terms of the number of users, with few limits. Thus, a business is no longer locked into a PBX switching unit with a fixed capacity. There is also no longer a need for a business to purchase or lease the expensive switching unit associated with a PBX system.

On the other hand, an IP based private branch exchange service also has certain inherent disadvantages. Chief among them is that Internet connectivity is required to receive incoming calls and place outgoing calls. Even if a first employee of a business wishes to place an intra-office call to a second employee of the same business, in the same building, it is necessary for the call to be routed through the IP based private branch exchange service, which is only reachable via the Internet. This is true even when the first and second employees' IP telephony devices are connected to the same local area network that provides access to the Internet.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications. Similarly, an IP based private branch exchange (PBX) service provider may perform similar functions.

Figure 1:
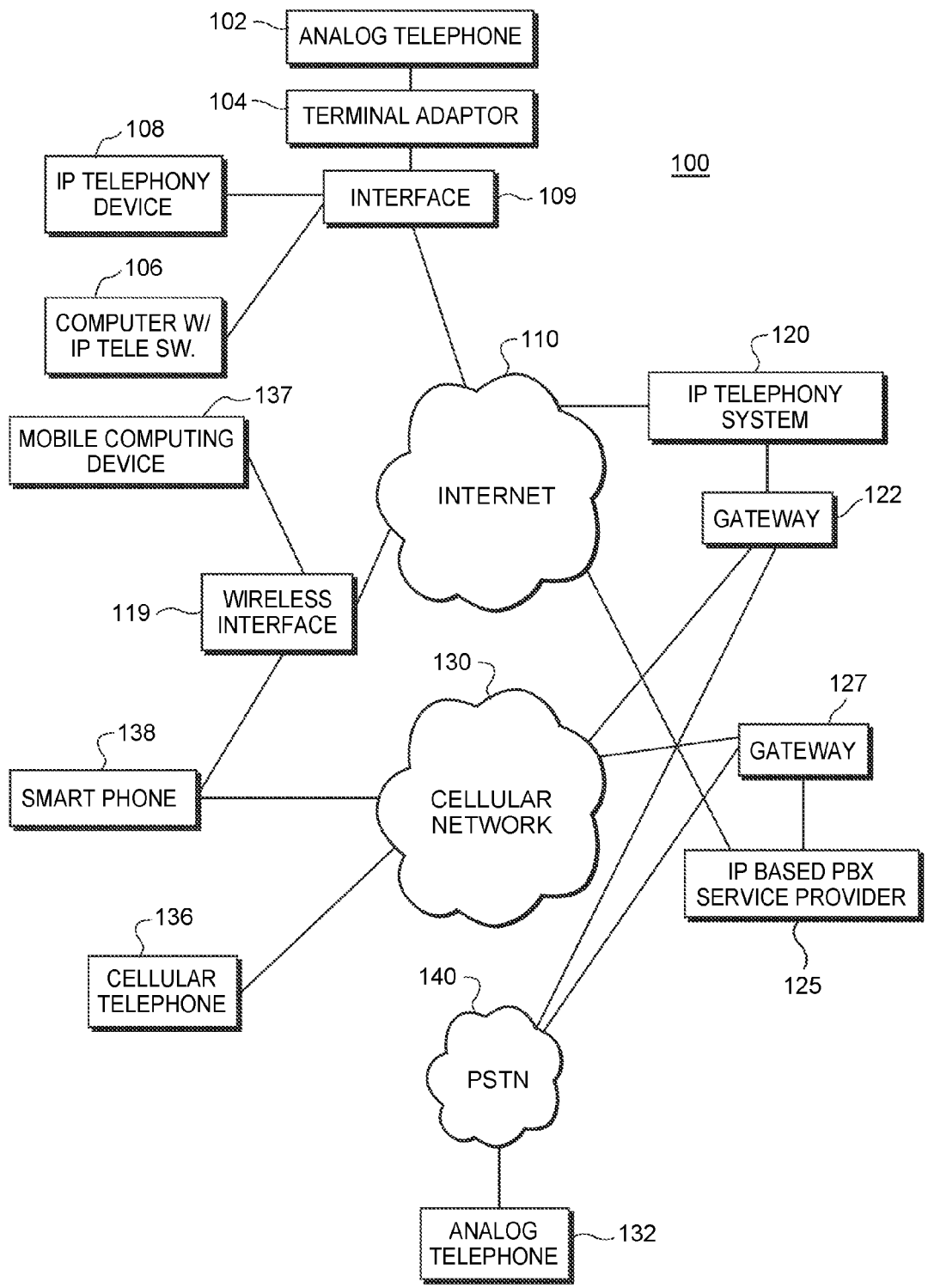
FIG. 1 is a diagram of a communications environment including various elements which are associated with an Internet protocol (IP) telephony system and an IP based private branch exchange service provider in accordance with an embodiment of the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to a publicly switched telephone network (PSTN) 140 and/or a cellular network 130 via one or more gateways 122.

Likewise, an IP based PBX service provider 125 is configured to connect telephone calls between its own customers and other parties via data communications that pass over a data network. The IP based PBX service provider 125 is connected to a publicly switched telephone network (PSTN) 140 and/or a cellular network 130 via one or more gateways 127, or directly, so that customers of the IP based PBX service provider 125 can be connected to parties that are reachable only through the PSTN 140 or cellular network 130.

In some instances, the gateways 122, 127 would be a part of the IP telephony system 120 and/or the IP based PBX service provider 125. In other instances, the gateways 122, 127 could be maintained by a third party.

Customers of the IP telephony system 120 and/or the IP based PBX service provider 125 can place and receive telephone calls using an IP telephone 108 that is connected to the Internet 110 via a data network interface 109. The IP telephone 108 could be connected to the data network interface 109 via a wired or wireless connection.

Alternatively, a customer could utilize a normal analog telephone 102 which is connected to the Internet 110 via a terminal adapter 104 and the data network interface 109. The terminal adapter 104 converts analog signals from the telephone 102 into data signals that pass over the Internet 110, and vice versa. Analog telephony devices include, but are not limited to, standard telephones and document imaging devices such as facsimile machines. A configuration using a terminal adapter 104 is common where the analog telephone 102 is located in a residence or business In addition, a customer could utilize a computer that is running IP telephony software 106 to place and receive IP based telephone calls, and to access other IP telephony systems (not shown). Here again, the computer running IP telephony software 106 would access the Internet 110 via the data network interface 109. In some instances, the IP telephony software could be assigned its own telephone number. In other instances, the IP telephony software could be associated with a telephone number that is also assigned to an IP telephone 108, or to a terminal adaptor 104 that is connected to an analog telephone 102.

In addition, a mobile computing device 137 which is running IP telephony software could also be used to place and receive telephone calls through the IP telephony system 120 and/or the IP based PBX service provider 125. The mobile computing device 137 accesses the Internet 110 via a wireless data network interface 119. The wireless data network interface could be a WiFi or WiMax router, or any other type of wireless data interface device capable of communicating wirelessly with the mobile computing device 137.

A third party using an analog telephone 132 which is connected to the PSTN 140 may call a customer of the IP telephony system 120 and/or the IP based PBX service provider 125. In this instance, the call is initially connected from the analog telephone 132 to the PSTN 140, and then from the PSTN 140, through the gateways 122, 127 to the IP telephony system 120 or the IP based PBX service provider 125. The IP telephony system 120 or IP based PBX service provider 125 then routes the call to the customer's IP telephony device. A third party using a cellular telephone 136 could also place a call to a customer of the IP telephony system 120 or IP based PBX service provider 125, and the connection would be established in a similar manner, although the first link would involve communications between the cellular telephone 136 and a cellular telephone network 130.

A smart phone 138 which includes cellular telephone capabilities could also be used to conduct telephony communications through the IP telephony system 120, the IP based PBX service provider 125 and/or the cellular network 130. For example, an IP telephony software application running on the smart phone 138 could communicate with the IP based PBX service provider 125 via the Internet 110. The smart phone 138 could access the Internet 110 via the wireless data network interface device 119, or via a data channel of the cellular network 130. Of course, alternate embodiments could utilize any other form of wired or wireless communications paths to enable communications.

Users of the IP telephony system 120 and the IP based PBX service provider 125 are able to access the services of these systems from virtually any location where they can connect to the Internet 110. Thus, a customer could register with an IP based PBX service provider 125 located in the U.S., and that customer could then use an IP telephone 108 located in a country outside the U.S. to access the services. Likewise, the customer could also utilize a computer outside the U.S. that is running IP telephony software to access the IP based PBX service provider 125. Further, in some instances a user could place a telephone call with the analog telephone 132 or the cellular telephone 136 that is routed through the PSTN 130 or cellular network 140 to the IP based PBX service provider 125 via the gateway 127. This would typically be accomplished by the user calling a local telephone number that is routed to the IP based PBX service provider 125 via the gateway 127. Once connected to the IP based PBX service provider 125, the user may then place an outgoing long distance call to anywhere in the world using the IP based PBX service provider 125. Thus, the user is able place a long distance call using lower cost IP telephony service provided by the IP based PBX service provider 125, rather than a higher cost service provided by the PSTN 140 or cellular network 130.

Figure 2:
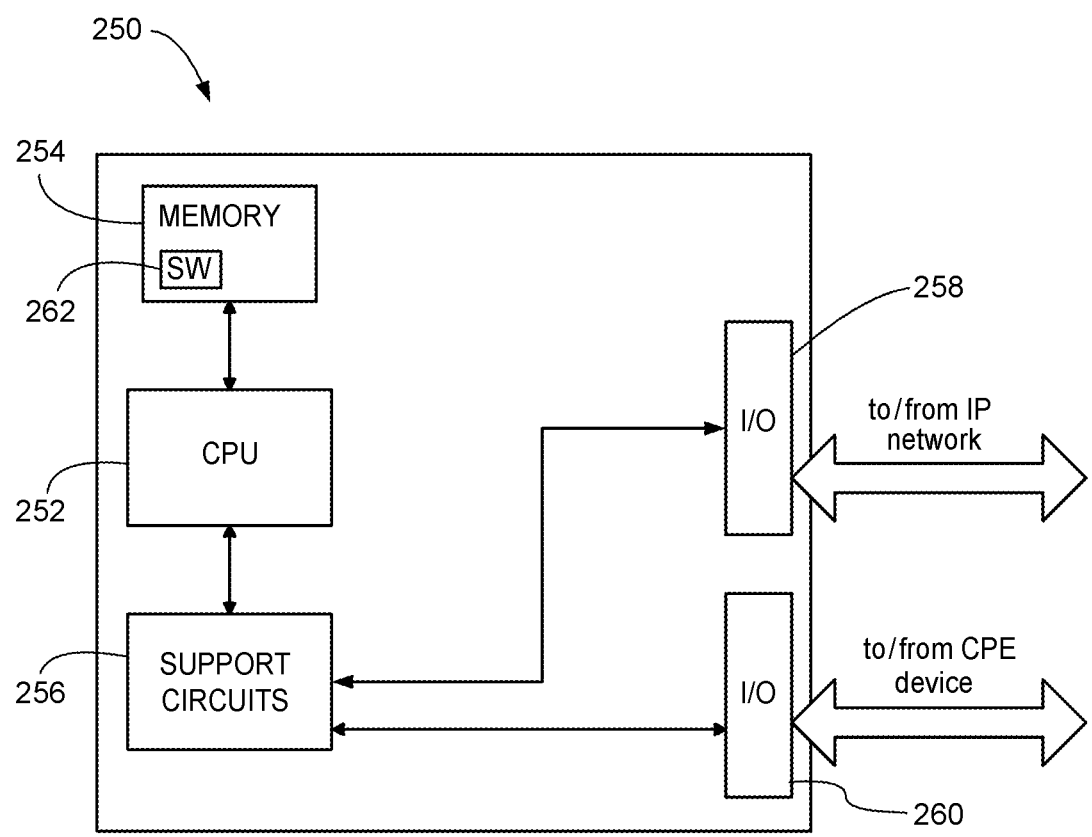
FIG. 2 is a diagram of various elements of a processor that forms part of an IP telephony system, an IP based private branch exchange service provider, or an IP telephony device according to embodiments of the invention.

FIG. 2 illustrates elements of a computer processor 250 that can be used as part of the IP telephony system 120, the IP based PBX service provider 125, or a telephony device to accomplish various functions. The IP telephony system 120 or the IP based PBX service provider 125 could include multiple processors 250 located at various locations in the system, along with their operating components and programming, each carrying out a specific or dedicated portion of the functions performed by the IP telephony system 120 or IP based PBX service provider 125.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120 or IP based PBX service provider 125. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

References to an "IP telephony device" appear in both the foregoing and following descriptions. This term is used to refer to any type of device which is capable of interacting with an IP telephony system to conduct a communication. An IP telephony device could be an IP telephone, a computer running IP telephony software, a telephone adapter which is connected to an analog telephone, or some other type of device capable of communicating via data packets. An IP telephony device could also be a cellular telephone or a portable or tablet computing device that runs a software client that enables the device to act as an IP telephone. Thus, a single device might be capable of operating as both a cellular telephone and an IP telephony device.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod Touch™ can interact with an IP telephony system to conduct a telephone call.

The following description will also refer to telephony communications and telephony activity. These terms are intended to encompass all types of telephony communications, regardless of whether all or a portion of the communications are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Figure 3:
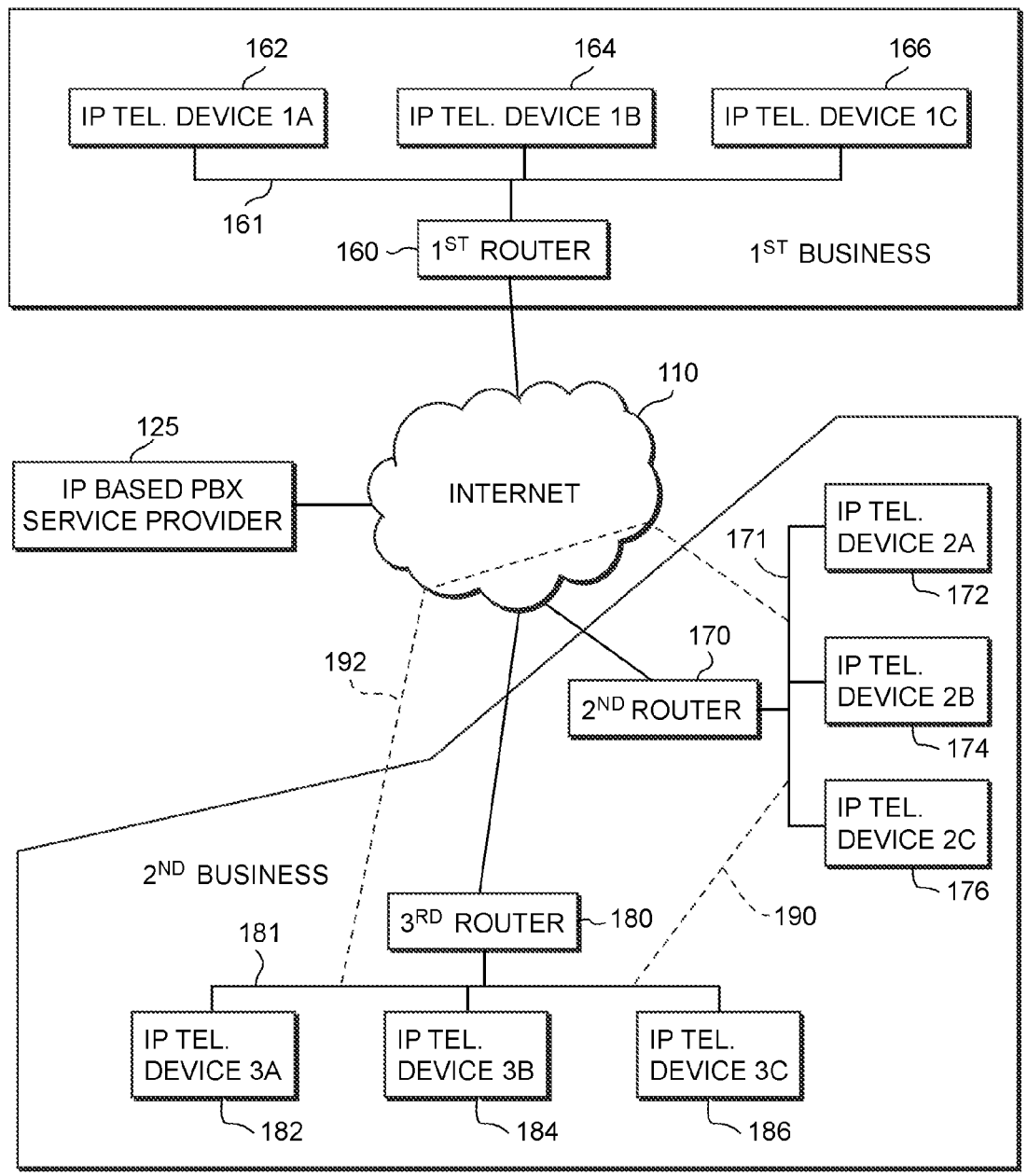
FIG. 3 is a diagram illustrating the functional connections between an IP based private branch exchange service provider and the individual IP telephony devices that utilize the services of the IP based private branch exchange service provider.

FIG. 3 depicts the functional connections between an IP based PBX service provider 125 and two businesses that utilize the PBX services of the IP based PBX service provider 125.

A first business has a first local area network 161 that is connected to the Internet 110 via a $1^{st}$ router 160. User IP telephony devices 162, 164, 166 are coupled to the first local area network 161, and can access the Internet 110, and the IP based PBX service provider 125 via the $1^{st}$ router 160.

The second business has two separate physical locations. A second local area network 171 is present at the first physical location. A second router 170 connects the second local area network 171 to the Internet 110. User IP telephony devices 172, 174, 176 are coupled to the second local area network 171 and can access the Internet 110 and the IP based PBX service provider 125 via the second router 170. A third local area network 181 is present at a second physical location of the second business. A third router 180 couples the third local area network 181 to the Internet 110. User telephony devices 182, 184, 186 are coupled to the third local area network 181 and can access the Internet 110 and the IP based PBX service provider 125 via the third router 180.

In some embodiments, when a business has multiple local area networks, a virtual private network connection may be established between the local area networks such that IP telephony devices connected to a first local area network can directly contact IP telephony devices on a second local area network. The virtual private network connection could be established over a private data network or over the Internet.

For example, the second business illustrated in FIG. 3 utilizes the second local area network 171 and the third local area network 181. In some embodiments, a virtual private network connection 190 could be established between the second local area network 171 and the third local area network 181 over a private data network owned or controlled by the second business. Alternatively, a virtual private network connection 192 could be established between the second local area network 171 and the third local area network 181 over the Internet 110. In either case, this would allow the IP telephony devices 172, 174, 176 connected to the second local area network 171 to communicate directly with the IP telephony devices 182, 184, 186 connected to the third local area network 181, even though the two local area networks are in two different physical locations.

When the first and second businesses setup their PBX services with the IP based PBX service provider 125, they can cede control over their central telephone lines to the PBX service provider 125. Thereafter, when an incoming call is placed to the first business's main telephone number, the call will be routed to the PBX service provider 125, and the PBX service provider 125 can connect the call to a receptionist or to an individual at the first business. Calls to telephone numbers assigned to the user IP telephony devices 162, 164, 166 also initially would be routed to the IP based PBX service provider 125, and the PBX service provider 125 would route the calls to appropriate user IP telephony devices.

A similar situation would pertain for the second business. However, the second business has two separate physical locations. This fact would be virtually undetectable to people outside the business who place a call to a main telephone number of the second business or to a telephone number associated with one of the user IP telephony devices.

It is common for PBX systems that utilize a physical switching device to allow a first user with a first telephony device connected to the PBX switching device to place a call to a second user of a second telephony device connected to the PBX switching device without actually placing a call through an outside telephony system, such as the PSTN. Often, the first user can simply dial the extension number of the second user, and the PBX switching device directly connects the two parties without making use of an outside telephone line.

In the case of IP based PBX telephony systems, however, whenever a user wishes to setup a telephony communication with another party, the telephony communication is routed through the IP based PBX service provider. This is true for calls to parties outside the business, and also for calls to other users within the same business. Thus, if a first person at the first business using IP telephony device 162 wishes to setup a telephony communication with a second person at the first business using IP telephony device 166, the telephony communication is still routed through the IP based PBX service provider 125. This, of course, requires that the telephony communication be routed over the Internet 110. If Internet connectivity is lost or impaired, then it is impossible for the first person using IP telephony device 162 to talk to the second person using IP telephony device 166, even though the first and second IP telephony devices 162, 166 are connected to the same local area network 161.

In the systems and methods described below, each of the individual user IP telephony devices that are associated with the same business or account are informed of the local addresses of the other IP telephony devices associated with the same business or account. This local address information is stored in local memory of the IP telephony devices. When a first person within a business wishes to setup a telephony communication with a second person within the same business, the first person's IP telephony device first checks for local address information for the second person's IP telephony device. If this local address information is available, the first person's IP telephony device sets up the telephony communication directly with the second person's IP telephony device, likely over a local area network, without involving assets of the IP based PBX service provider. In many instances, this eliminates the need to send any portion of the telephony communication over the Internet. Thus, the communication can be conducted, even when Internet access is unavailable or impaired. This method of conducting internal telephony communications also reduces the business' consumption of Internet bandwidth, freeing that bandwidth for other purposes. Further, communicating in this fashion frees the assets of the IP based PBX service provider for other uses.

Figure 4:
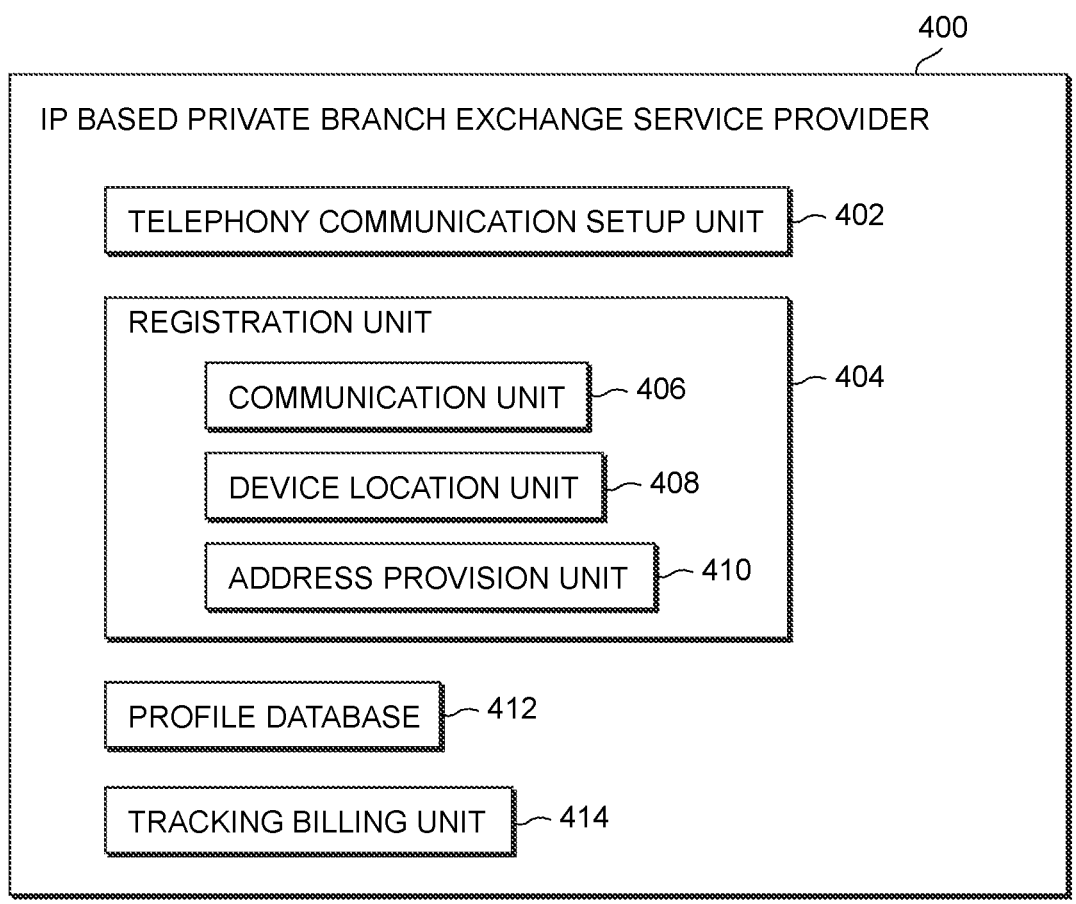
FIG. 4 is block diagram illustrating various elements of an IP based private branch exchange service provider according to an embodiment of the invention.

FIG. 4 illustrates selected elements of an IP based PBX service provider 400 embodying the invention. The elements include a telephony communication setup unit 402 that sets up telephony communications for users. This includes incoming calls directed to a user's telephone number and outgoing calls initiated by a user. A registration unit 404 registers user IP telephony devices when they are first connected to the Internet. The registration unit 404 may also periodically communicate with user IP telephony devices via routers to ensure that connectivity between the IP based PBX service provider 400 and the user IP telephony devices is maintained. Specifically, such periodic communications may be necessary to keep a pinhole timer of a router open so that the IP based PBX service provider can always send a new communication to a user IP telephony device.

The registration unit 404 includes a communication unit 406 that is responsible for communicating with user IP telephony devices. A device location unit 408 determines when two or more IP telephony devices are connected to the same local area network, and/or are associated with the same business or account. This determination process will be described in detail below. An address provision unit 410 tracks the local addresses of each of the user IP telephony devices on their respective local area networks. This allows the local address information to be provided to individual user IP telephony devices, when appropriate, as will be discussed in detail below.

A profile database 412 contains profile information for individual users and their IP telephony devices. This information can be helpful in ensuring that communications to and from a user's IP telephony device are conducted in the proper format. The profile database 412 may also include information about the current status of individual user telephony devices. For example, the profile database 412 may indicate when a user IP telephony device is conducting a telephony communication. In that instance, if a new incoming call directed to the user IP telephony device is received, it could be routed to voicemail or handled in some other fashion. The profile database 412 also may include information about limitations on the telephony services that can be provided to individual user IP telephony devices. For example, some user IP telephony devices may be blocked from initiating outgoing international calls, or from conducting certain toll bearing calls.

A tracking/billing unit 414 tracks the communications activity of user IP telephony devices and bills a business accordingly for that usage.

Although the elements illustrated in FIG. 4 may be present in some embodiments of an IP based PBX service provider, in other embodiments additional elements may also be present. Likewise, not all of the elements illustrated in FIG. 4 may be present in all embodiments of an IP based PBX service provider. Thus, FIG. 4, and the description provided above, should in no way be considered limiting.

Figure 5:
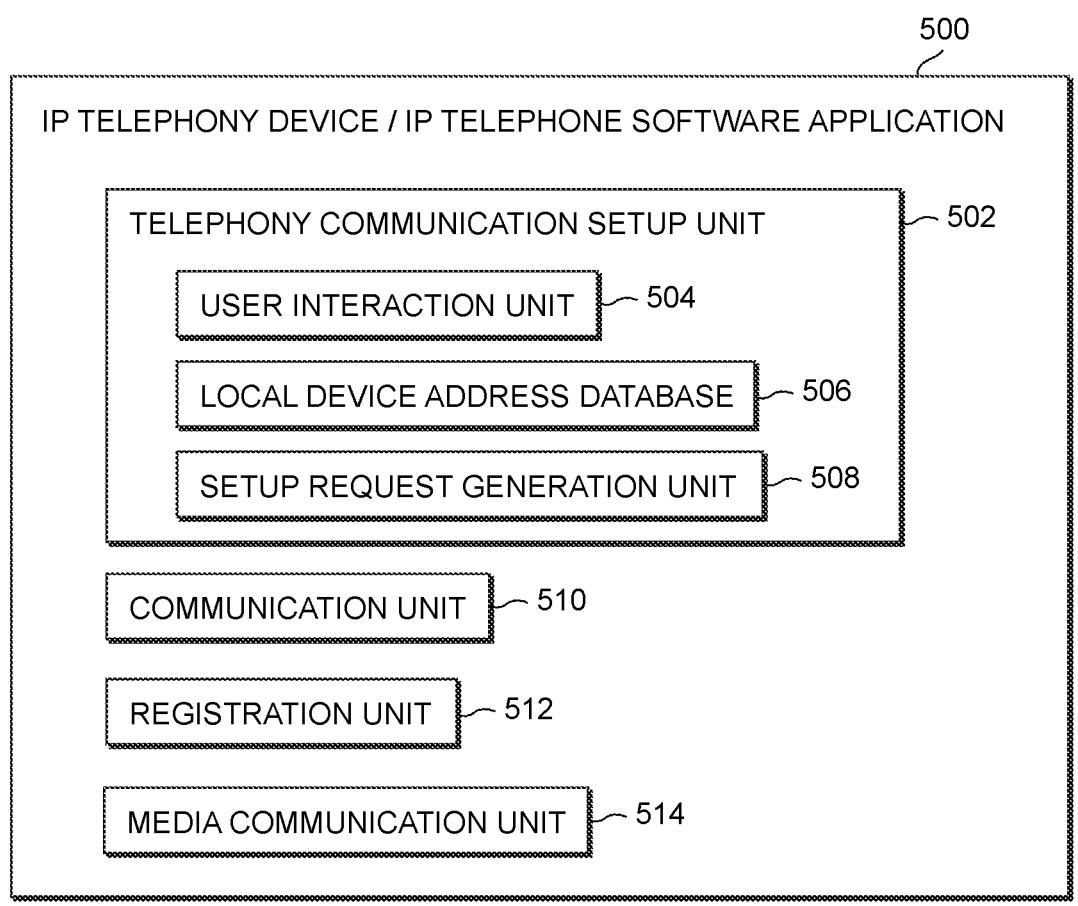
FIG. 5 is a block diagram of various elements of an IP telephony device or an IP telephony software application which may be resident on a user's telephony device according to an embodiment of the invention.

FIG. 5 illustrates selected elements of a user IP telephony device embodying the invention. Alternatively, FIG. 5 could illustrate elements that may be present in IP telephony software that is running on a computing device or smart phone, and which configures the computing device or smart phone to act as a user IP telephony device.

The elements include a telephony communication setup unit 502 that is responsible for setting up new telephony communications for the user. The telephony communication setup unit 502 includes a user interaction unit 504 that interacts with a user to receive user instructions and to obtain information from the user. The user interaction unit 504 can make use of various different user interfaces including display screens, speakers, microphones and speech recognition software to interact with a user.

A device local address database 506 stores local address information for other user telephony devices. As explained above, this information could be used to setup new telephony communications directly with another user's IP telephony device, thereby bypassing the IP based PBX service provider. In instances where a business has multiple physical locations, the information in the local device address database may enable a first user's IP telephony device at a first physical location to setup a new telephony communication with a second user's IP telephony device that is located at a second physical location. The information stored in the local device address database 506 could be obtained from the IP based PBX service provider, from the other IP telephony devices, or from other sources. The local device address database may be present in a non-volatile memory module of an IP telephony device.

A setup request generation unit 508 generates setup requests for new telephony communications. A setup request could take the form of a Session Initiation Protocol (SIP) Invite message. However, other setup request formats also could be used. The way in which a setup request is generated by the setup request generation unit 508 is explained in detail below.

A communication unit 510 is responsible for actually communicating a setup request to either the IP based PBX service provider, or another user IP telephony device. In some instances, the communication unit 510 also may send information about the status of the IP telephony device to the IP based PBX service provider, such as whether the user IP telephony device is engaged in a telephony communication. The communication unit 510 also may receive local address information for other IP telephony devices, and store this local address information in the local address database 506.

A registration unit 512 is responsible for registering the IP telephony device 500 with an IP based PBX service provider. The information sent by the registration unit 512 to the IP based PBX service provider could include a local address of the IP telephony device on a local area network.

A media communication unit 514 is responsible for communicating data packets bearing the media of a telephony communication once a telephony communication has been setup.

Although the elements illustrated in FIG. 5 may be present in some embodiments of an IP telephony device, or in an IP telephony software application, in other embodiments additional elements also may be present. Likewise, not all of the elements illustrated in FIG. 5 may be present in all embodiments of an IP telephony device or an IP telephony software application. Thus, FIG. 5, and the description provided above, should in no way be considered limiting.

Figure 6:
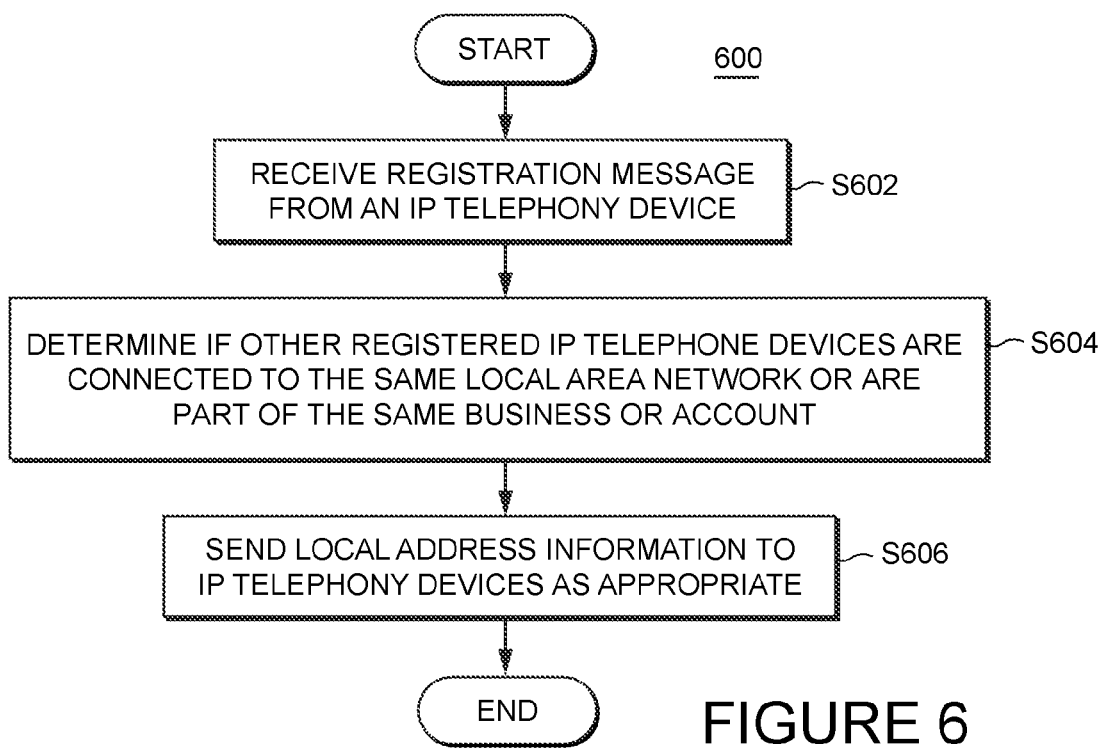
FIG. 6 is a flowchart illustrating steps of a method that would be performed by elements of an IP based private branch exchange service provider to receive registration requests from user IP telephony devices and to provide local address information to user IP telephony devices.

FIG. 6 illustrates steps of a method that is performed by elements of the IP based PBX service provider to receive a registration request from a user IP telephony device, and to disseminate local address information, as appropriate. For ease of explanation, the following description assumes that the registration request is received from an IP telephony device. However, the registration request also could have been received from an IP telephony software application running on a user's computing device or smart phone.

The method 600 begins and proceeds to step S602, where the communication unit 406 of a registration unit 404 of the IP based PBX service provider 400 receives a registration request from a first user's IP telephony device. The registration request will have been received from a particular IP address at which the first user's IP telephony device can be reached. If the registration request is sent through a router, the registration request will likely indicate a port number of the router at which the IP telephony device can be reached. If the IP telephony device is coupled to a local area network, local address information for the first user's IP telephony device on the local area network will be included in the registration request. The local address information can include an internal IP address and port number that has been assigned to the first user's IP telephony device on the local area network. The internal IP address and port number could be used by a second user's IP telephony device that is connected to the same local area network to directly contact the first user's IP telephony device over the local area network. Also, in situations where two local area networks are connected to one another by a virtual private network connection, a third user's IP telephony device connected to a different local area network could use the local address information to directly contact the first user's IP telephony device via the virtual private network connection.

In some embodiments, the registration request also may include information identifying the business or account with which the first user's IP telephony device is associated. This could be an account number that the business has with the IB based PBX service provider.

In step S604 the device location unit 408 of the registration unit 404 determines if other registered IP telephony devices are connected to the same local area network, and/or are associated with the same business or account as the first user's IP telephony device. In some embodiments, the device location unit 408 assumes that any other IP telephony device that sent a registration message originating from the same IP address as the first user's IP telephony device is connected to the same local area network as the first user's IP telephony device, and therefore is associated with the same business or account. This would be the case if all of the IP telephony devices are communicating through the same router connected to a local area network. In other embodiments, information identifying the local area network may be included in the registration request sent by the first user's IP telephony device, and this identifying information is compared to corresponding information provided by other IP telephony devices that have registered to determine if the first user's IP telephony device is connected to the same local area network as the other IP telephony devices. In still other embodiments, a business or account identifier that is included with registration information provided by the first user's IP telephony device is compared to the identifiers provided by other registered IP telephony devices. Thus, even where two IP telephony devices are connected to different local area networks, and register from different public IP addresses, the device location unit 408 is able to determine that they are associated with the same business or account. Other techniques also may be used to determine if the if other registered IP telephony devices are associated with the same business or account, or are connected to the same local area network as the registering IP telephony device.

In step S606, the address provision unit 410 uses the communication unit 406 to send local address information to those IP telephony devices that should receive it. How this step is performed will vary depending on the result of the determination made in step S604.

If performance of step S604 indicates that several other user IP telephony devices that have already registered with the system are present on the same local area network as the registering IP telephony device, or are associated with the same business or account, then in step S606 the address provision unit 410 sends local address information for the registering IP telephony device to each of those other IP telephony devices that are connected to the same local area network and/or that are associated with the same business or account. Likewise, the address provision unit 410 sends local address information for each of the IP telephony devices that are connected to the same local area network and/or that are associated with the same business or account and that have already registered to the registering IP telephony device. As a result, all of the IP telephony devices connected to the same local area network and/or all of the IP telephony devices that are associated with the same business or account are informed of the local address information for each of the other registered IP telephony devices connected to the same local area network or that are associated with the same business or account. This allows all of the registered IP telephony devices connected to the same local area network or that are associated with the same business or account to setup telephony communications directly with each other, thereby eliminating or at least reducing the need to setup those telephony communications through the IP based PBX service provider.

Figure 7:
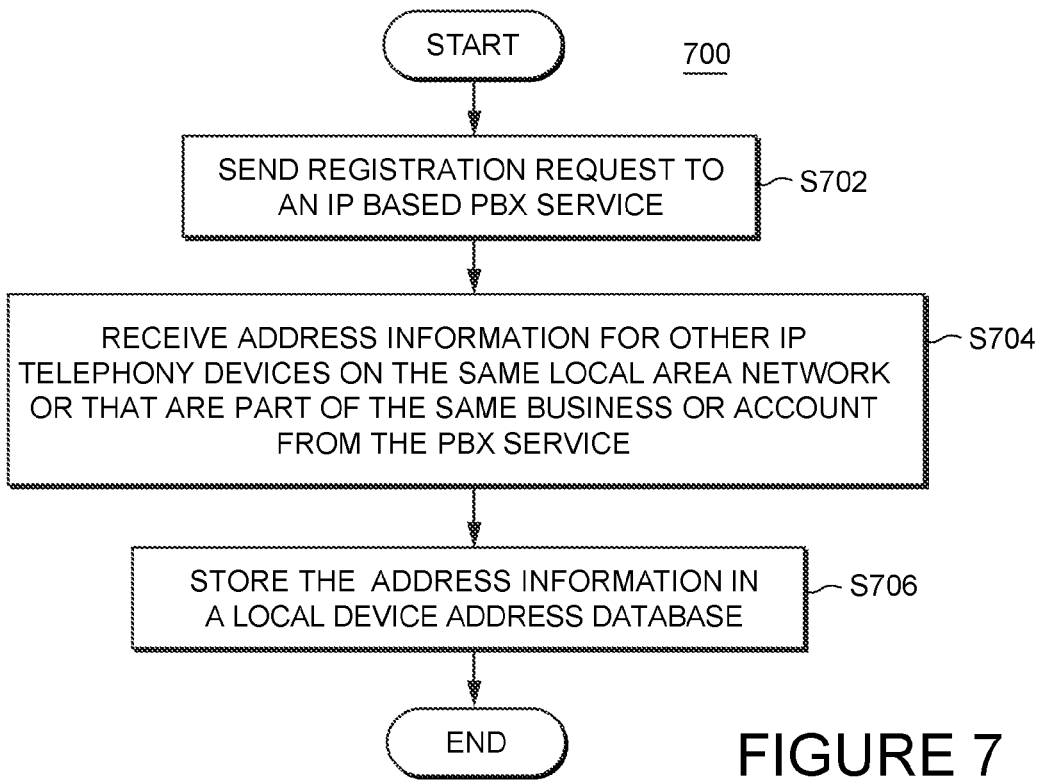
FIG. 7 is a flowchart illustrating steps of a method that would be performed by user IP telephony devices to register with an IP based private branch exchange service and to receive and store local address information for other user IP telephony devices.

FIG. 7 illustrates steps of a method that would be performed by an IP telephony device to register with the IP based PBX service provider. The method 700 begins and proceeds to step S702 where the registration unit 512 of a user IP telephony device or an IP telephony software application sends a registration message to the registration unit 404 of an IP based PBX service provider. The registration message includes local address information that indicates how other IP telephony devices can contact the registering IP telephony device to setup new IP telephony communications. The registration message may also include information about the business or account with which the IP telephony device is associated.

Next, in step S704, the IP telephony device receives local address information for other registered IP telephony devices that are connected to the same local area network, and/or that are associated with the same business or account, from the address provision unit 410 of the IP based PBX service provider. This local address information empowers the IP telephony device to setup new telephony communications directly with the other IP telephony devices connected to the same local area network or that are associated with the same business or account.

In step S706, the registering IP telephony device stores the local address information in a local device address database 506 of a telephony communication setup unit 502 of an IP telephony device or an IP telephony software application 500. As mentioned above, the local device address database may be stored in a non-volatile data storage unit of a telephony device. As a result, if the telephony device is turned off and on, or cycles through a re-boot, the local device address information will still be present. Also, if the telephony device re-registers with an IP telephony system, it may obtain updated local address information as part of the re-registration process, and then update the information in the local device address database accordingly. The method then ends.

In some embodiments, an address provision unit 410 of an IP based PBX service provider may send out periodic updates of local address information to individual user telephony devices, or to IP telephony software applications. These updates may be periodic in nature, and convey all changes in local address information which has occurred since the last update. Alternatively, a change in the local address information for first telephony device/IP telephony software application may trigger the address provision unit 410 to send out the new local address information for that first telephony device/IP telephony software application to other telephony devices/IP telephony software applications that may be interested in directly contacting the first telephony device/IP telephony software application.

Figure 8:
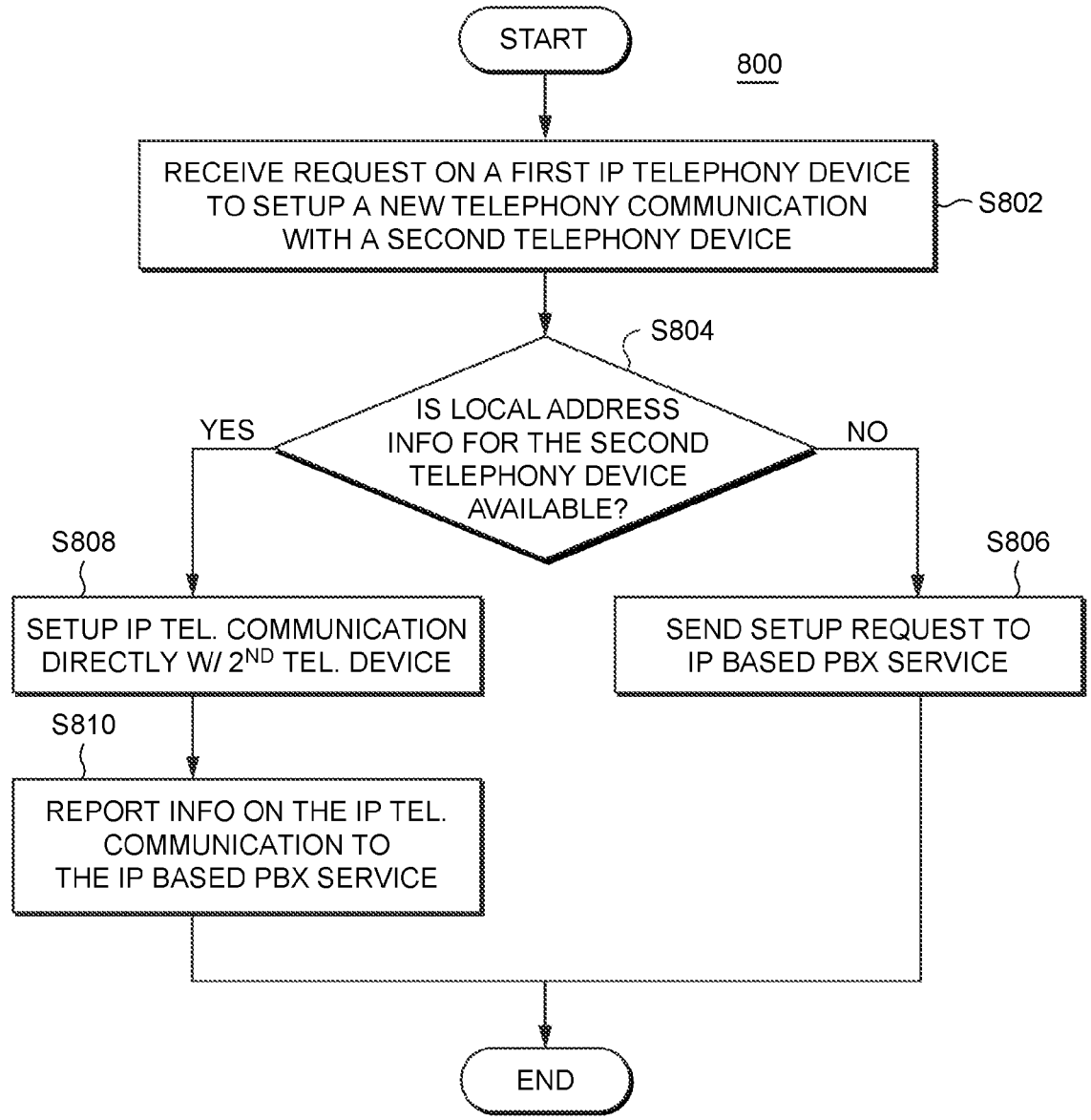
FIG. 8 is a flowchart illustrating steps of a method of that would be performed by a user IP telephony device to setup a new IP based telephony communication.

FIG. 8 illustrates steps of a method that is performed by a first IP telephony device or IP telephony device software application to setup a new telephony communication with another telephony device that is connected to the same local area network and/or that is associated with the same business or account. The method 800 begins and proceeds to step S802, where a user interaction unit 504 of the first IP telephony device receives a request to setup the new telephony communication with a second telephony device. In step S804, a check is performed to determine if local address information for the second telephony device is present in a device local address database 506 of the first IP telephony device. This would be the case if the second telephony device is also registered with the IP based PBX service provider, and the second telephony device is connected to the same local area network or is associated with the same business or account.

If the determination in step S804 indicates that no local address information is available the second telephony device in the local address database 506, the method proceeds to step S806, and the setup request generation unit 508 generates a telephony communication setup request that is sent by the communication unit 510 to the IP based PBX service provider. The telephony communication setup unit 402 of the IP based PBX service provider then sets up the requested telephony communication with the second telephony device.

If the determination in step S804 indicates that local address information is available for the second telephony device, the method proceeds to step S808, and the setup request generation unit 508 generates a telephony communication setup request that is sent directly to the second telephony device. The setup request could be sent over the same local area network to which the first IP telephony device is connected, or the setup request might traverse a virtual private network connection to another local area network to which the second IP telephony device is connected. The first IP telephony device and the second telephony device then setup and conduct the telephony communication. During the telephony communication, the media communication unit 514 of the first IP telephony device sends and receives data packets bearing the media of the telephony communication.

In some embodiments, the method will also include a step S810, where the first and/or second IP telephony device sends information about the telephony communication to the IP based PBX service provider. This could include a first message that indicates the telephony communication has commenced, which would inform the IP based PBX service provider that both the first and second telephony devices are now engaged in a telephony communication, and are not presently available for new incoming telephony communications that originate from other telephony devices. Likewise, when the telephony communication between the first and second telephony devices ends, the first and/or second telephony devices may send a message to the IP based PBX service provider indicating that the telephony communication has ended, and that the first and second telephony devices are now available for new incoming telephony communications. In yet other embodiments, additional information about the telephony communication between the first and second telephony devices may be reported to the IP based PBX service provider. The method then ends.

In some embodiments, the profile database 412 of an IP based PBX service provider may include information about user preferences, and that information may be used to help control how calls are routed and connected. For example, a user could indicate that if he is busy on an existing call, any new incoming calls should be sent to voicemail. Alternatively, the user could indicate that if he is busy with an existing call, he should be notified of the new incoming call, so that the user can switch to the new incoming call, if desired. A variety of other preferences could likewise be stored in the profile database, and those preferences could be used by IP based PBX service provider to determine how to handle individual telephony communications.

The above-described systems and methods make it possible for a first telephony device to conduct a telephony communication with a second telephony device without the involvement of assets of an IP based PBX system. Thus, the telephony devices can communicate even when an Internet connection is unavailable and/or when the IP based PBX system that normally facilitates such communications is unavailable or inoperative.

In the foregoing descriptions, it was assumed that in some instances, all IP telephony devices that are connected to the same local area network are associated with the same business or account. This may not always be the case. For example, two businesses may share the same local area network. In that instance, information provided by the individual IP telephony devices about which business or account they are associated with could be used to determine which IP telephony devices should receive local address information about other IP telephony devices, and vice versa.

Also, in some embodiments, a local area network could be located in a residence, as opposed to a business. In this instance, a typical IP telephony service provider would provide the IP telephony devices with telephony services. Under these circumstances, the IP telephony devices connected to the local area network could be used by members of the family that lives at the residence. All the same basic functions described above could still be provided by the IP telephony service provider. As a result, individual members of the family could contact one another over the local area network without establishing a telephony communication via the Internet and the IP telephone service provider.

Moreover, there may be instances where a multifamily dwelling, such as a condominium building or an apartment building, provides wireless access to all people in the multifamily dwelling over a single wireless local area network. However, each family could establish a separate account with an IP telephony service provider. Under these circumstances, when a first family member's IP telephony device registers with the IP telephony service provider, it would provide information about the account with which it is associated. The IP telephony service provider would then provide the first family member's IP telephony device with local address information for the IP telephony devices of other family members that are also registered under the same account. Further, certain IP telephony devices could be associated with the account, but not dedicated to an individual family member, such as an IP television, or central a residence telephony device. The local address information for those commonly used IP telephony devices also would be provided to the first family member's IP telephony device when it registers. This would allow each of the IP telephony devices associated with a single account to directly setup telephony communications with other IP telephony devices associated with the account, without the need for use of the IP telephony system assets. Also, although IP telephony devices that are associated with other accounts may utilize the same wireless local area network, each IP telephony device belonging to an account is only provided with local address information for the other IP telephony devices that are associated with the same account.

In many of the foregoing examples, IP telephony devices that utilize the services of an IP based PBX service provider obtain local address information from the IP based PBX service provider that enables the IP telephony devices to setup new telephony communications directly with other telephony devices, without the assistance of the IP based PBX service provider. However, the systems and methods described above are also applicable to IP telephony devices that utilize a regular IP telephony service provider. In other words, the IP telephony devices could receive the local address information from a regular IP telephony service provider, and the local address information would enable the IP telephony devices to setup new telephony communications with other telephony devices without the assistance of the IP telephony service provider.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method, performed by a first Internet protocol (IP) telephony device that is directly coupled to a local area network and that is associated with a first business or account, for conducting an IP telephony communication with a second IP telephony device that is also connected to a local area network and that is associated with the first business or account, comprising:
receiving, from an IP telephony service provider, the local area network addresses of IP telephony devices that are also associated with the first business or account, wherein the received local area network addresses include at least a local area network address that is assigned to the second IP telephony device;
storing the received local area network addresses in a local memory of the first IP telephony device;
receiving, at the first IP telephony device, a request to setup a telephony communication with the second IP telephony device;
retrieving, from the local memory, the local area network address assigned to the second IP telephony device; and
establishing an IP telephony communication directly with the second IP telephony device using the local area network address assigned to the second IP telephony device that was retrieved from the local memory of the first IP telephony device.

2. The method of claim 1, wherein the local area network address information is received from an IP based private branch exchange service provider.

3. The method of claim 1, further comprising reporting information relating to the IP telephony communication to the IP telephony service provider.

4. The method of claim 3, wherein the reporting step comprises reporting to the IP telephony service provider that the first IP telephony device is engaged in a telephony communication.

5. The method of claim 4, wherein the reporting step further comprises reporting to the IP telephony service provider that the first IP telephony device is no longer engaged in a telephony communication.

6. The method of claim 3, wherein the reporting step comprises reporting to the IP telephony service provider that the first IP telephony device has commenced a telephony communication with the second IP telephony device.

7. The method of claim 1, wherein the local area network addresses are received from the IP telephony service provider via a public data network.

8. The method of claim 1, wherein the local area network addresses are received from the IP telephony service provider when the first IP telephony device conducts a registration process with the IP telephony service provider via a public data network.

9. The method of claim 8, wherein the local area network addresses are for other IP telephony devices that are currently registered with the IP telephony service provider.

10. The method of claim 1, wherein the first IP telephony device and the second IP telephony device are connected to the same local area network, and wherein the IP telephony communication established between the first and second IP telephony devices is conducted via data packets that only traverse the local area network.

11. The method of claim 1, wherein the first IP telephony device and the second IP telephony device are connected to first and second local area networks, respectively, that are controlled by the first business and that are connected via a virtual private network connection, and wherein the IP telephony communication established between the first and second IP telephony devices is conducted via data packets that only traverse the first and second local area networks and the virtual private network connection.

12. A first IP telephony device that is configured to conduct an IP telephony communication with a second IP telephony device, comprising:
- a local memory for storing the local area network addresses of other IP telephony devices that are associated with the same business or account as the first IP telephony device;
- means for receiving a request to setup a telephony communication with a second IP telephony device that is associated with the same business or account as the first IP telephony device; and
- means for establishing an IP telephony communication directly with the second IP telephony device using local area network address information for the second IP telephony device that is retrieved from the local memory of the first IP telephony device.

13. A non-transitory computer readable medium storing thereon instructions which, when performed by one or more processors of a first Internet protocol (IP) telephony device that is directly coupled to a local area network and that is associated with a first business or account, cause the first IP telephony device to perform a method for conducting an IP telephony communication with a second IP telephony device that is also connected to a local area network and that is also associated with the first business or account, the method comprising:
- receiving, from an IP telephony service provider, the local area network addresses of IP telephony devices that are also associated with the first business or account, wherein the received local area network addresses include at least a local area network address that is assigned to the second IP telephony device;
- storing the received local area network addresses in a local memory of the first IP telephony device;
- receiving, at the first IP telephony device, a request to setup a telephony communication with the second IP telephony device; and
- establishing an IP telephony communication directly with the second IP telephony device using the local area network address for the second IP telephony device that was retrieved from the local memory of the first IP telephony device.

14. The non-transitory computer readable medium of claim 13, wherein the local area network addresses are received from an IP based private branch exchange service provider.

15. The non-transitory computer readable medium of claim 13, wherein the method further comprises reporting information relating to the IP telephony communication to the IP telephony service provider.

16. The non-transitory computer readable medium of claim 15, wherein the reporting step comprises reporting to the IP telephony service provider that the first IP telephony device is engaged in a telephony communication.

17. The non-transitory computer readable medium of claim 16, wherein the reporting step further comprises reporting to the IP telephony service provider that the first IP telephony device is no longer engaged in a telephony communication.

18. The non-transitory computer readable medium of claim 15, wherein the reporting step comprises reporting to the IP telephony service provider that the first IP telephony device has commenced a telephony communication with the second IP telephony device.

19. The non-transitory computer readable medium of claim 13, wherein the local area network addresses are received from the IP telephony service provider via a public data network.

20. The non-transitory computer readable medium of claim 13, wherein the local area network addresses are received from the IP telephony service provider when the first IP telephony device conducts a registration process with the IP telephony service provider via a public data network.

21. The non-transitory computer readable medium of claim 20, wherein the local area network addresses are for other IP telephony devices that are currently registered with the IP telephony service provider.

22. The non-transitory computer readable medium of claim 13, wherein the first IP telephony device and the second IP telephony device are connected to the same local area network, and wherein the IP telephony communication established between the first and second IP telephony devices is conducted via data packets that only traverse the local area network.

23. The non-transitory computer readable medium of claim 13, wherein the first IP telephony device and the second IP telephony device are connected to first and second local area networks, respectively, that are controlled by the first business and that are connected via a virtual private network connection, and wherein the IP telephony communication established between the first and second IP telephony devices is conducted via data packets that only traverse the first and second local area networks and the virtual private network connection.

* * * * *